(12) United States Patent
Suzuki

(10) Patent No.: US 12,378,015 B2
(45) Date of Patent: Aug. 5, 2025

(54) FLIGHT DEVICE WITH END PARTS DISPLACEABLE ALONG FRONT END PARTS OF WING PARTS

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/550,257

(22) PCT Filed: Mar. 17, 2021

(86) PCT No.: PCT/JP2021/010734
§ 371 (c)(1),
(2) Date: Sep. 12, 2023

(87) PCT Pub. No.: WO2022/195747
PCT Pub. Date: Sep. 22, 2022

(65) Prior Publication Data
US 2024/0208643 A1    Jun. 27, 2024

(51) Int. Cl.
| | |
|---|---|
| *B64U 30/12* | (2023.01) |
| *B64C 3/40* | (2006.01) |
| *B64C 29/02* | (2006.01) |
| *B64D 9/00* | (2006.01) |
| *B64U 10/20* | (2023.01) |
| *B64U 50/13* | (2023.01) |
| *B64U 101/31* | (2023.01) |

(Continued)

(52) U.S. Cl.
CPC ............. *B64U 30/12* (2023.01); *B64C 3/40* (2013.01); *B64C 29/02* (2013.01); *B64D 9/00* (2013.01); *B64U 10/20* (2023.01); *B64U 50/13* (2023.01); *B64U 2101/31* (2023.01); *B64U 2101/55* (2023.01); *B64U 2101/60* (2023.01)

(58) Field of Classification Search
CPC .. B64C 3/38; B64C 3/40; B64C 29/02; B64U 10/20; B64U 30/12
See application file for complete search history.

(56) References Cited

U.S. PATENT DOCUMENTS

| | | | | |
|---|---|---|---|---|
| 2,315,117 | A | * | 3/1943 | Freytag ...................... B64C 1/22 244/118.3 |
| 2017/0283052 | A1 | * | 10/2017 | Moshe .................... B64C 29/02 |

(Continued)

FOREIGN PATENT DOCUMENTS

| | | |
|---|---|---|
| JP | 2012081936 A | 4/2012 |
| JP | 2017015697 A | 1/2017 |

(Continued)

OTHER PUBLICATIONS

International Search Report dated May 18, 2021 for International Application No. PCT/JP2021/010734.

*Primary Examiner* — Arfan Y. Sinaki
(74) *Attorney, Agent, or Firm* — HAUPTMAN HAM, LLP

(57) ABSTRACT

A flight vehicle with a more basic structure and safety measures according to the invention comprises a main body part; a propulsion part provided with one or more propulsion means; a connection part connecting the main body part and the propulsion part in a displaceable manner within a predetermined range; and a wing part provided on at least one of the main body part or the propulsion part. With such a configuration, a flight vehicle with a more basic structure and safety measures can be provided.

4 Claims, 9 Drawing Sheets

(51) Int. Cl.
  *B64U 101/55* (2023.01)
  *B64U 101/60* (2023.01)

(56) References Cited

U.S. PATENT DOCUMENTS

2018/0281941 A1* 10/2018 Hutson ............... B64C 29/0016
2019/0225333 A1   7/2019 Petrov
2020/0017211 A1*  1/2020 Hefner .................. B64D 31/06

FOREIGN PATENT DOCUMENTS

| JP | 2017159751 A | 9/2017 |
| JP | 2020050335 A | 4/2020 |
| JP | 2020108997 A | 7/2020 |

* cited by examiner

FLIGHT DEVICE WITH END PARTS DISPLACEABLE ALONG FRONT END PARTS OF WING PARTS

TECHNICAL FIELD

This invention relates to flight vehicles.

BACKGROUND ART

In recent years, various services have been provided using rotary-wing aircraft such as drones and unmanned aerial vehicles (UAVs: Unmanned Aerial Vehicles), which are used for a variety of purposes (hereinafter simply referred to as "flight vehicles") (see, for example, Patent Literature 1).

Among such flight vehicles, there is a flight vehicle disclosed in Patent Literature 2 that is equipped with a loading part for carrying cargo.

PRIOR ART LIST

Patent Literature

[Patent Literature 1] JP2017-015697A
[Patent Literature 2] JP2017-159751A

SUMMARY OF THE INVENTION

Technical Problem

When carrying the aforementioned cargo/load, the technology described in Patent Literature 2 has a complicated structure and does not take measures against crosswinds during descent, which poses a safety problem.

Therefore, one purpose of this invention is to provide a flight vehicle with a more basic structure and safety measures.

Technical Solution

According to the invention,
there is provided a flight vehicle, comprising:
a main body part;
a propulsion part provided with one or more propulsion means;
a connection part connecting the main body part and the propulsion part in a displaceable manner within a predetermined range; and
a wing part provided on at least one of the main body part or the propulsion part.

Advantageous Effects

The invention could provide a flight vehicle with a more basic structure and safety measures.

DETAILED DESCRIPTION OF THE EMBODIMENTS

Figure 1:
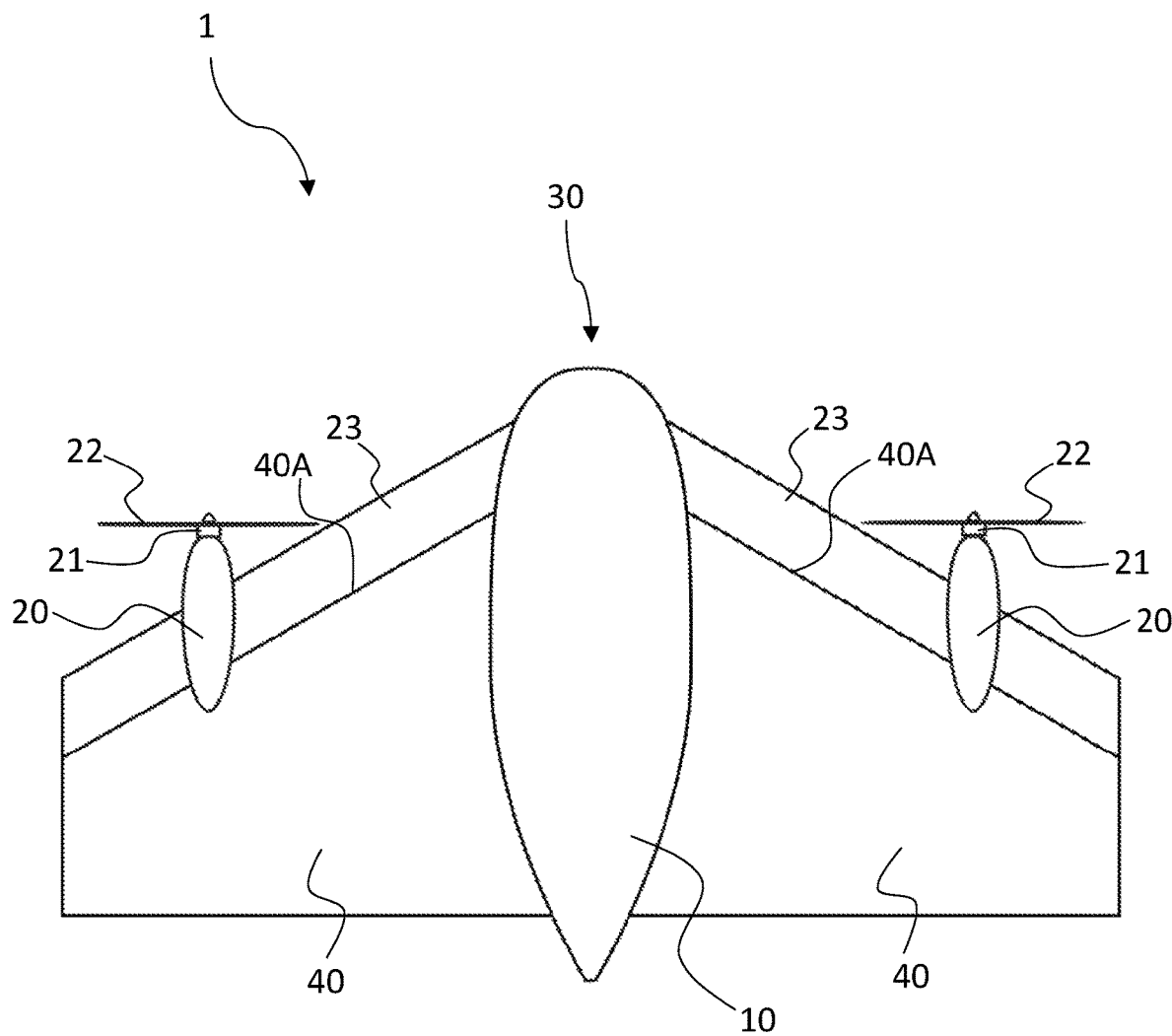
FIG. 1 shows a diagram of a flight vehicle in accordance with Embodiment 1 of this invention. The flight vehicle shown in the figure is in horizontal flight.

This embodiment of the invention comprises the following:

[Item 1]
A flight vehicle, comprising:
a main body part;
a propulsion part provided with one or more propulsion parts;
a connection part connecting the main body part and the propulsion part in a displaceable manner within a predetermined range; and
a wing part provided on at least one of the main body part or the propulsion part.

[Item 2]
The flight vehicle according to item 1, further comprising:
a control part that enables a transition between a first state in which the relative positional relationship between the propulsion part and the main body part is fixed at least during horizontal flight, and a second state in which the relative positional relationship between the propulsion part and the main body part is displaceable via the connection part at least during descent.

[Item 3]
The flight vehicle according to item 2,
wherein, in the first state, the propulsion part is oriented in a direction of travel; and
wherein, in the second state, the propulsion part is oriented in a direction oblique to the vertical direction.

[Item 4]
The flight vehicle of item 3,
wherein
the propulsion part has two ends, each having a rotary wing part that generates propulsive force; and
wherein the connection part connects the front part of the main body part and the substantially central part of the propulsion part.

[Item 5]
The flight vehicle according to item 4,
wherein the main body part has two wing parts;
wherein the two wing parts have front ends sloping backwardly; and
wherein the two end parts are displaceable along the front end starting from the connection part.

[Item 6]
The flight vehicle according to item 4,
wherein each of the two end parts has a wing parts;
wherein the two wing parts have rearwardly inclined front end parts; and wherein the propulsion part is provided at said front end part.

[Item 7]

The flight vehicle as in any one of items 1 to 6, wherein the main body part is provided with a support leg mechanism to support the flight vehicle.

[Item 8]

The flight vehicle as in any one of items 1 to 7, wherein the displacement direction includes at least a yaw direction.

[Item 9]

The flight vehicle according to item 8 wherein the direction of displacement is only in the yaw direction.

[Item 10]

The flight vehicle according to any one of items 2 to 9, comprising:

a storage part capable of moving a cargo/load from the front to the rear, wherein, at least in a first state, the cargo is positioned forward.

[Item 11]

The flight vehicle according to item 10, wherein, at least in the landing state, the cargo is positioned rearwardly.

The flight vehicle according to this embodiment of this invention is described next with reference to figures.

<Structure>

Figure 2:
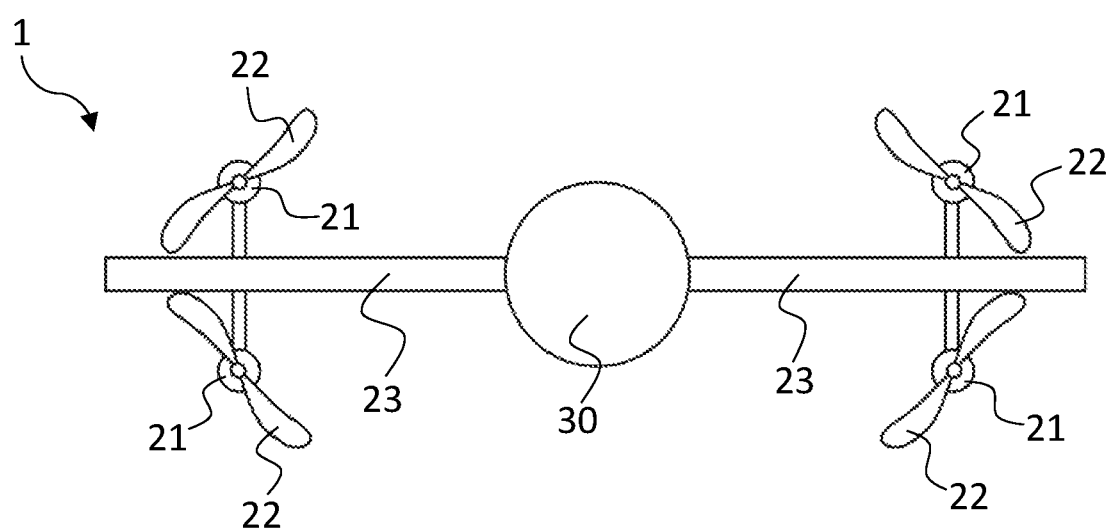
FIG. 2 shows a flight vehicle of Embodiment 1 of this invention. The flight vehicle shown in the figure is in the state of landing.
Figure 2:
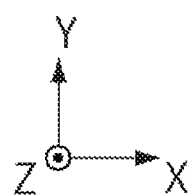

As shown in FIG. 1 and FIG. 2, this embodiment of flight vehicle 1 comprises a main body part 10, a propulsion part 20, a connection part 30, a wing part 40, and a control part (not shown). The propulsion part 20 is provided with one or more propulsion parts. In this embodiment, the propulsion part 20 is provided with two motors 21 as propulsion means, one on each side centered on the connection part 30. The motors 21 generate the rotation of the propeller 22 described below, for example, the drive unit can include an electric motor, an engine, or the like.

The connection part 30 connects the main body part 10 and the propulsion part 20 in a displaceable manner within a predetermined range. In this embodiment, the connection part 30 employs a gimbal that can be pivoted around one axis.

The control part controls the transition between a first state and a second state. The first state is a state in which the relative positional relationship between the propulsion part 20 and the main body part 10 is fixed, at least in horizontal flight. The second state is a state in which the relative positional relationship between the propulsion part 20 and the main body part 10 is displaceable via the connection part 30, at least during descent.

The wing part 40 is provided on at least one of the main body part 10 or the propulsion part 20. In other words, the wing part 40 may be provided on the main body part 10 (Example 1) or on the propulsion part 20 (Example 2), which are described below.

Example 1

The propulsion part 20 has a propeller 22 (rotary wing part) and a motor 21 that generates propulsion. The propeller 22 can be driven by the motor 21 and rotates clockwise and/or counterclockwise around the axis of rotation of the motor 21 (e.g., the long axis of the motor).

The connection part 30 connects the front of the main body part 10 to the substantially center of the propulsion part 20. The main body part 10 has two wing parts 40. Two wing parts 40 have a front end part 40A that slopes backward. Two end parts 23 can be displaced along the front end part 40A starting from the connection part 30.

<Configuration of Flight>

Referring to FIG. 1 through FIG. 4, the following is a description of the configuration of the flight vehicle during takeoff, during the flight, and during the landing of the flight vehicle in this embodiment.

As shown in FIG. 1, when attempting to ascend from the state of landing (initial state), the propeller 22 is oriented upward (i.e., upward propulsion is generated). When ascending, motor 21 is rotated in the state shown in the figure. When the flight vehicle 1 is ascending and hovering, the vertical ascent is performed as it is in the state shown in FIG. 1.

When the transition from hovering to horizontal flight is complete, the flight vehicle 1 transitions to the first state. In the first state, the relative position of the propulsion part 20 and the main body part 10 is fixed. As shown in FIG. 1, in the first state, the motor 21 is facing in the direction of travel (forward). By orienting the motor 21 in the forward direction, the flight vehicle 1 will be able to obtain propulsive force to move forward.

When the flight vehicle arrives at its destination or other location, it will transform itself to the same attitude as in FIG. 1 in order to hover again. In this state, the flight vehicle descends for landing. During descent, the flight vehicle transitions from the first state to the second state shown in FIG. 3. In the second state, the relative position of the propulsion part 20 and the main body part 10 can be displaced through the connection part 30. In the second state, the motor 21 is oriented in a direction oblique to the vertical direction. In other words, in the second state, the main body part 10 remains perpendicular to the landing surface, and only the motor 21 is tilted. Therefore, even if the wind is blowing, the flight vehicle can both maintain its attitude and control the position of the vehicle.

In the second state, the propulsion part 20 moves forward, and the center of gravity G is shifted backward as the propulsion part 20 moves. This helps to stabilize the attitude of the flight vehicle. Furthermore, the vertical component of the propulsive force to move forward can be smaller than that shown in FIG. 1 because the motor 21 is oriented obliquely to the vertical direction, thereby increasing the descent speed. In addition, the flight vehicle 1 can land without lowering the rpm of the motor 21 more than necessary. Therefore, the minimum speed of motor 21 can be increased while taking measures against updrafts.

Example 2

Figure 3:
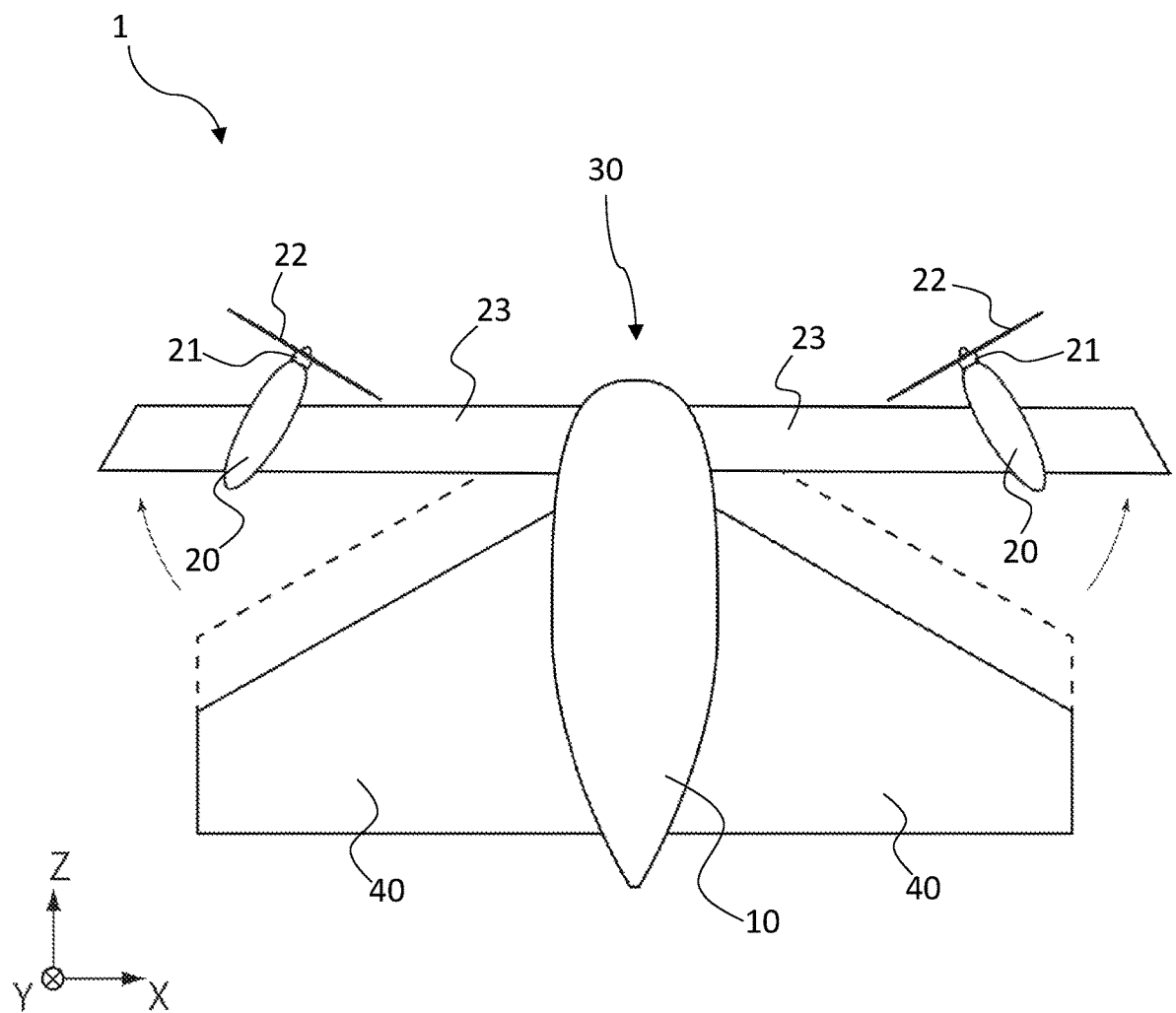
FIG. 3 shows a flight vehicle of Embodiment 1 of the invention. The flight vehicle shown in the figure is in the state of landing.
Figure 4:
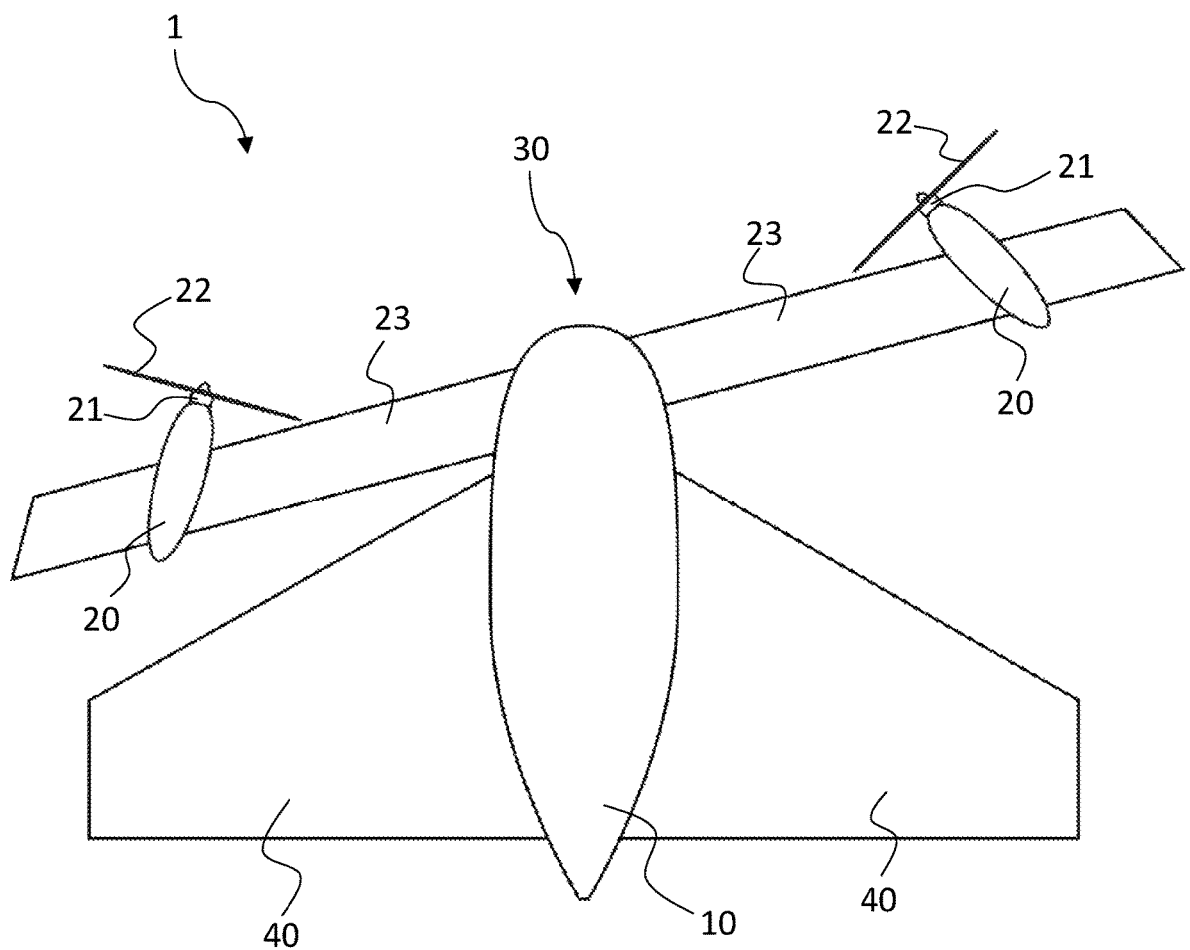
FIG. 4 shows a flight vehicle of Embodiment 1 of the invention. The flight vehicle shown in the figure is in the state of landing.
Figure 5:
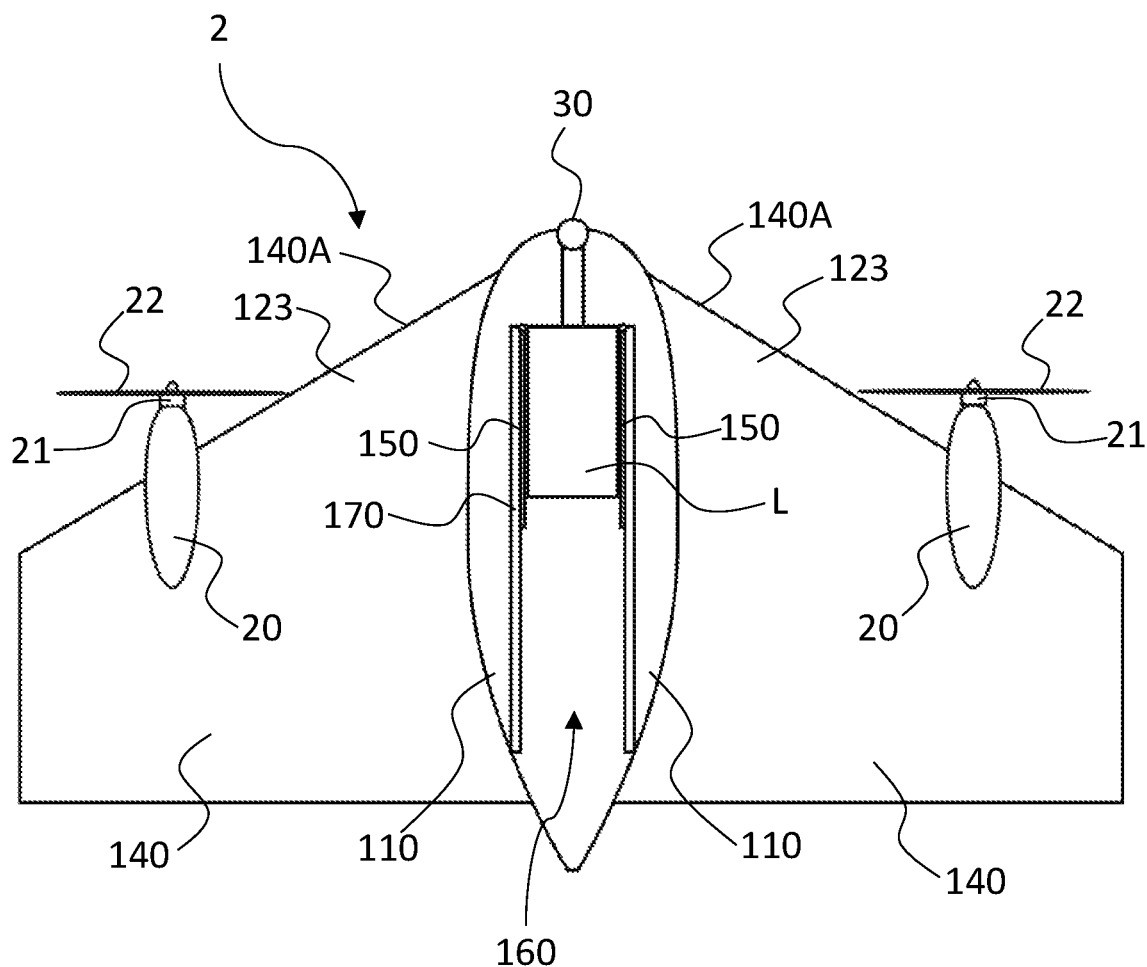
FIG. 5 shows a flight vehicle of Embodiment 2 of the invention. The flight vehicle shown in the figure is in horizontal flight.
Figure 6:
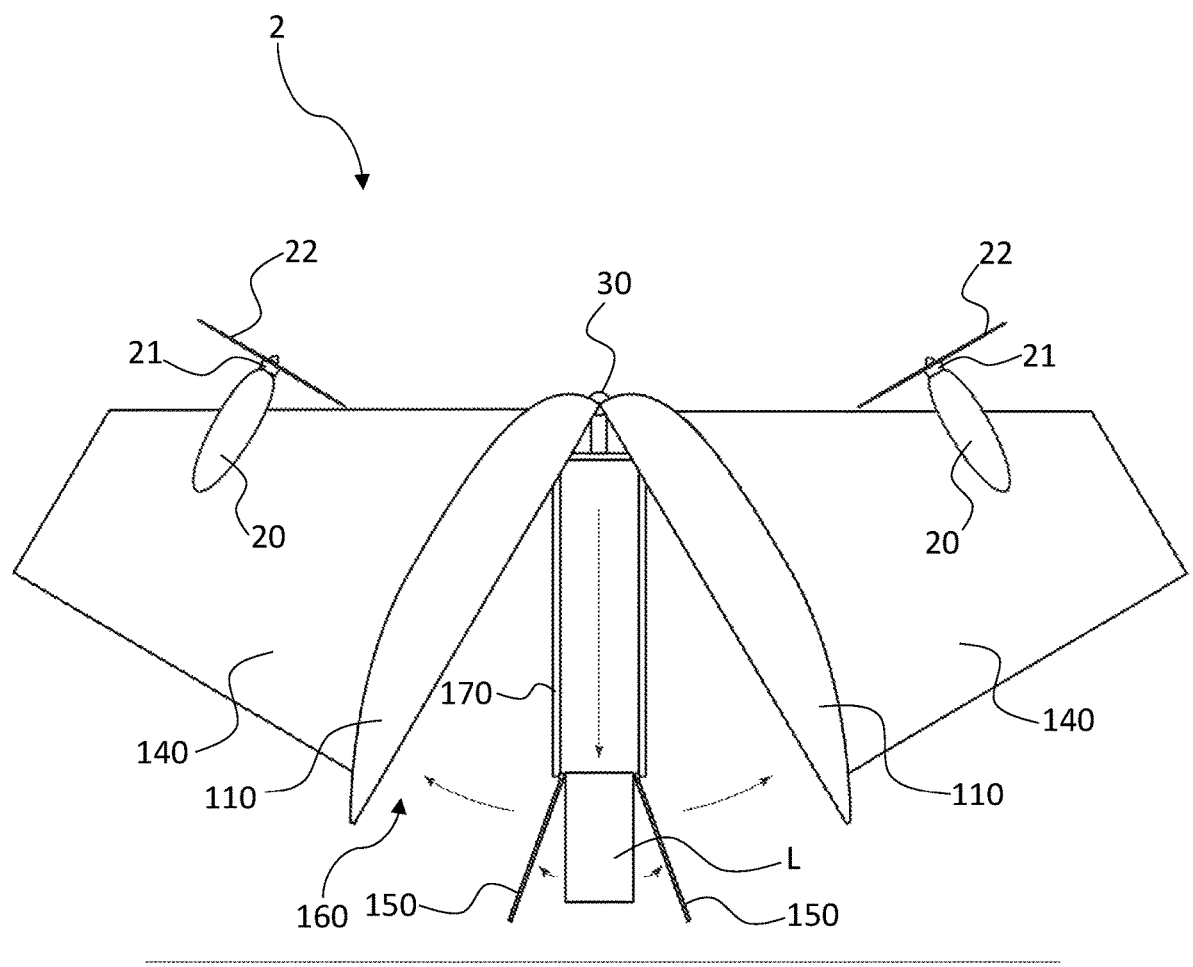
FIG. 6 shows a flight vehicle is of Embodiment 2 of the invention. The flight vehicle illustrated is in the state of landing.

Referring now to FIG. 3 and FIG. 4, the flight vehicle of the second embodiment of this invention is described. The parts with the same last two digits of reference numerals as in the first embodiment may be omitted from the description since they are the same as those described in the first embodiment unless otherwise indicated. Next, referring to FIG. 5 and FIG. 6, the flight vehicle for Example 2 will be described. The parts with the same last two digits of reference numerals as in Example 1 may be omitted from the description since they are the same as those described in Example 1 unless otherwise indicated.

Two end parts 123 each have wing parts 140. Two wing parts 140 have a front end part 140A that slopes backward. Propulsion part 21 is provided at the front end part 140A.

The main body part 110 is provided with a support leg mechanism 150 that supports the flight vehicle 2. The main body part 110 has an opening 160 for deploying or housing the support leg mechanism 150 with respect to the main body part 110. The opening 160 has a widened shape that expands downward and outward from the connection part 30 when the support leg mechanism 150 is deployed with respect to the main body part 110.

The flight vehicle 2 is equipped with a storage part 170 that can move cargo L from the front to the rear. At least in a first state, the cargo L is positioned forward. The first state is a state in which the relative positional relationship between the propulsion part 20 and the main body part 10 is fixed, at least in horizontal flight. In the first state, the motor 21 is facing in the direction of travel (forward).

The flight vehicle 2 positions the cargo L rearward, at least during landing. This causes the center of gravity G to be shifted backward.

Figure 7:
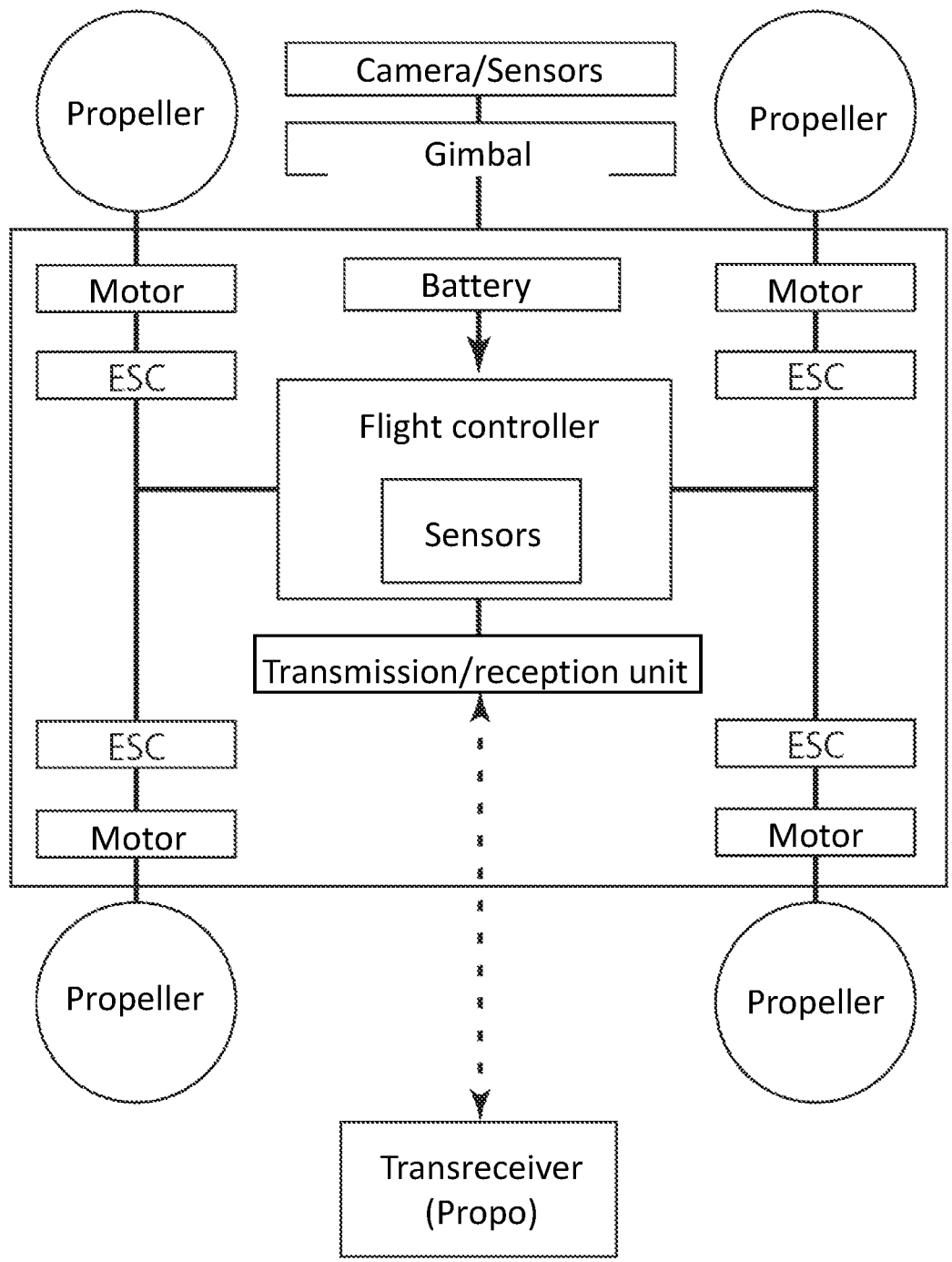
FIG. 7 shows a functional block of a flight part of the flight vehicle shown in FIG. 1 or FIG. 5.

The rotorcraft described above has the functional blocks shown in FIG. 7. The functional blocks in FIG. 7 are a minimum reference configuration. The flight controller is a so-called processing unit. The processing unit can have one or more processors, such as a programmable processor (e.g., central processing unit (CPU)).

The processing unit has a memory, not shown, that is accessible to the memory. The memory stores logic, code, and/or program instructions that can be executed by the processing unit to perform one or more steps.

Memory may include, for example, a separable medium such as an SD card, random access memory (RAM), or an external storage device. Data acquired from cameras and sensors or the likes may be directly transmitted to and stored in the memory. For example, still and moving image data captured by a camera or other device is recorded in the internal or external memory.

The processing unit includes a control module comprising to control the state of the rotorcraft. For example, the control module controls the propulsion mechanism (e.g., motor) of the rotorcraft to adjust the spatial arrangement, velocity, and/or acceleration of the rotorcraft having six degrees of freedom (translational motion x, y and z, and rotational motion θx, θy and θz). The control module can control one or more of the states of the loading part, sensors, etc.

The processing unit is capable of communicating with a transmission/reception unit comprised of one or more external devices (e.g., terminal, display, or other remote controller) to transmit and/or receive data. The transmitter and receiver can use any suitable means of communication, such as wired or wireless communication.

For example, the transmission/reception unit may use one or more of the following: local area network (LAN), wide area network (WAN), infrared, wireless, WiFi, point-to-point (P2P) network, telecommunications network, or cloud communication.

The transmission/reception unit can transmit and/or receive one or more of the following: data acquired by sensors or the likes, processing results generated by the processing unit, predetermined control data, and user commands from a terminal or a remote controller.

Sensors or the likes in this embodiment can include inertial sensors (accelerometers, gyroscopes), GPS sensors, proximity sensors (e.g., lidar), or vision/image sensors (e.g., cameras).

The rotorcraft of this invention can be expected to be used as a flight vehicle exclusively for courier services over medium to long distances, and as an industrial rotorcraft for wide-area surveillance, reconnaissance and rescue operations in mountainous areas. In addition, the rotorcraft of the invention can be used in aircraft-related industries such as multicopter drones, and can also be suitably used as a flight vehicle that can carry a camera or other equipment to perform aerial photography missions, and can also be used in various industries such as security, agriculture, and infrastructure monitoring, etc.

The above mentioned embodiments are merely examples to facilitate understanding of the invention and are not intended to be construed as limiting the invention. It goes without saying that the invention may be changed and improved without departing from its purpose, and that the invention includes its equivalents.

The above example describes an example in which the direction of displacement is only in the yaw direction (around the Y-axis). The invention is not limited to this, as long as the direction of displacement includes at least the yaw direction. In other words, in addition to the yaw direction, displacement in the roll and/or pitch directions is also possible.

The above example shows an example of employing a gimbal that can be pivoted around one axis as the connection part 30. However, the invention is not limited to this. For example, a gimbal that can be freely pivoted around two or three axes may be employed as the connection part 30.

In the above examples, the wing part 40 is provided on the main body part 10 (Example 1) and on the propulsion part 20 (Example 2), and these are described in the examples above. Of course, wing parts 40 may be provided on both the main body part 10 and the propulsion part 20.

(Variation)

Figure 8:
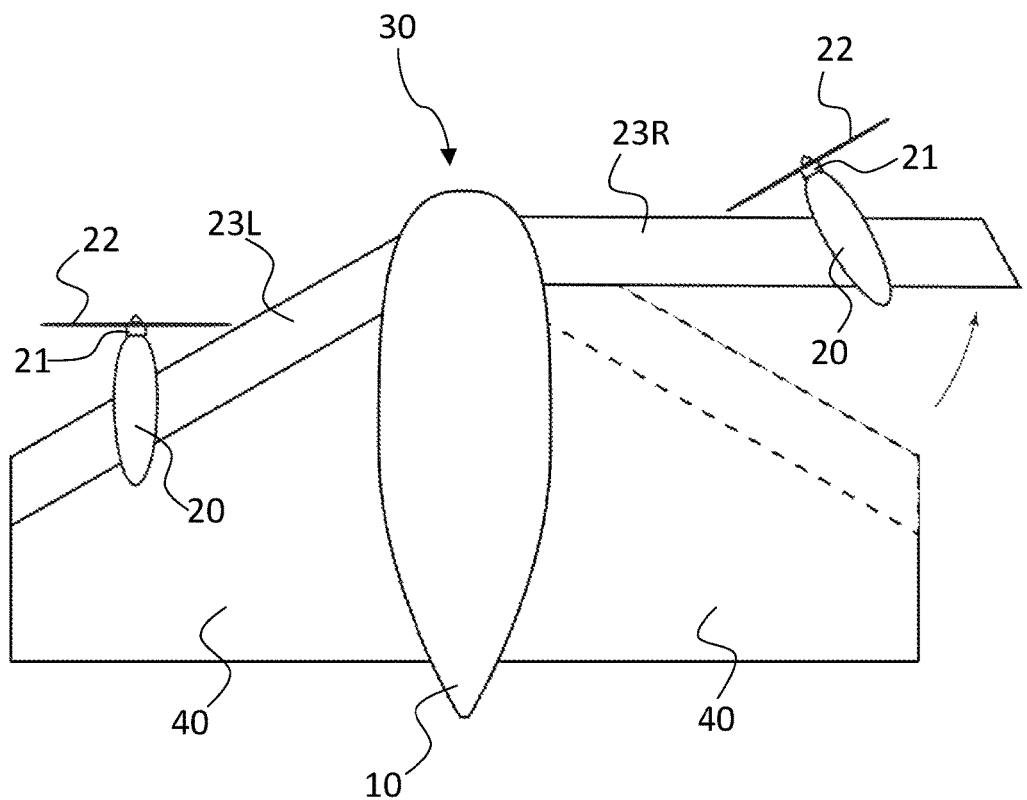
FIG. 8 shows a flight vehicle of a variation of the invention (Part 1).
Figure 9:
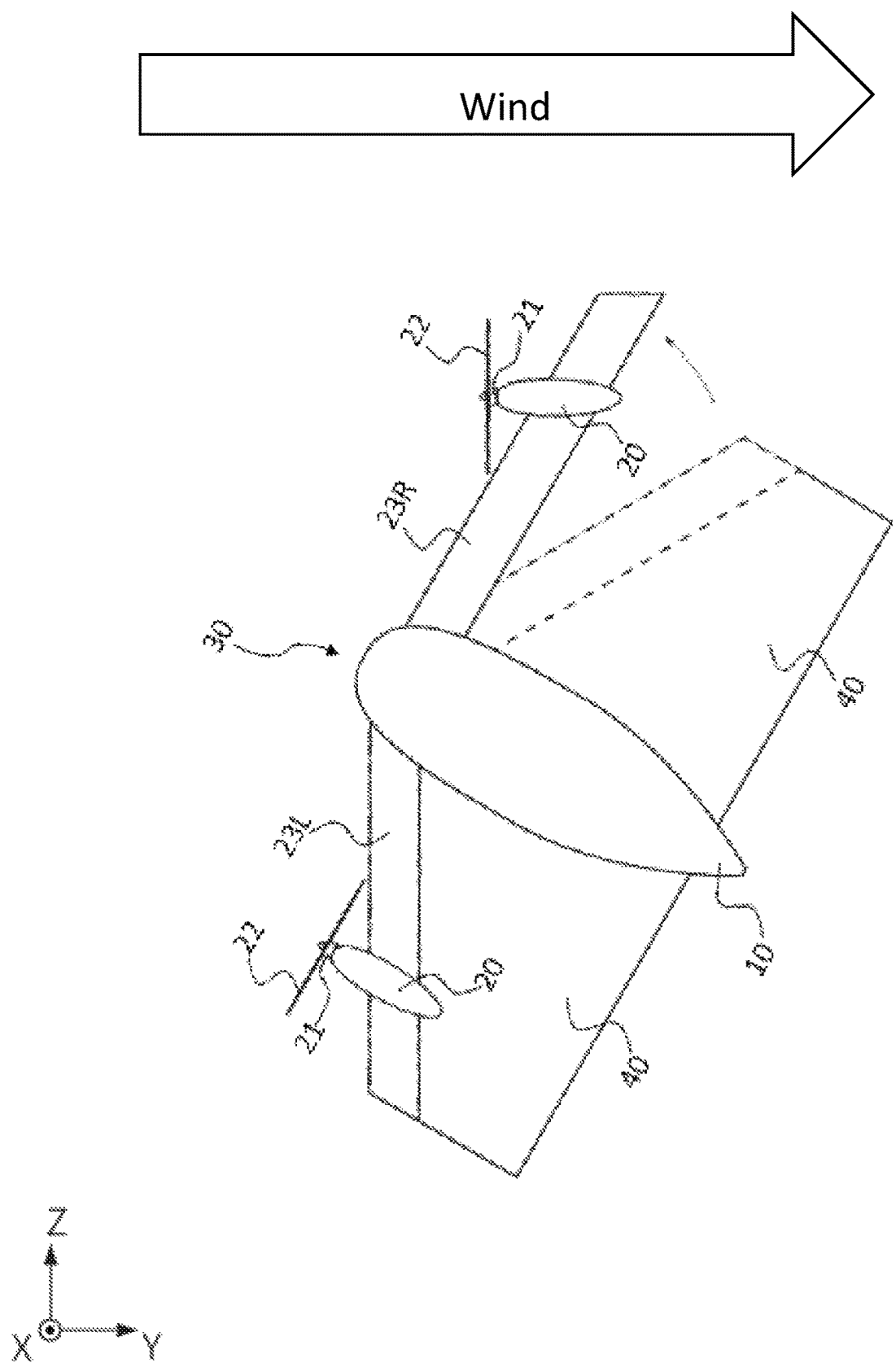
FIG. 9 shows a flight vehicle of a variation of the invention (Part 2).

As shown in FIG. 8, Two end parts 23 may be partially movable. That is, the left side part 23L of the paper surface of the two end part 23 may be fixed to the wing part 40, and only the right side part 23R of the paper surface may be movable in the yaw direction (around the Y axis). According to this configuration, as shown in FIG. 9, by rotating the motor 21 on the right side portion 23R of the paper surface and stopping the rotation of the motor 21 on the left side portion 23L of paper surface, the flight vehicle can hover as if floating downstream.

DESCRIPTION OF REFERENCE NUMERALS

1, 2 Flight vehicle
10, 110 Main body part
20 Propulsion unit
21 Motor (propulsion means)
22 Propeller (rotary wing part)
23, 123 Two end part
40 Wing part 40A, 140A Front end
140 Two wing parts
150 Support leg mechanism
170 Storage part
L Cargo/Load

The invention claimed is:

1. A flight vehicle, comprising:
a main body part;
end parts connected to the main body part;
a propulsion part on each of the end parts;
a connection part connecting the main body part and the end parts; and
a wing part on the main body part, the wing part comprising wing parts, each wing part comprising a front end part sloping backwardly,
wherein
the connection part is configured to displace the end parts, in a predetermined range, from the front end parts while the end parts remain connected to the main body part, the end parts displaceable along the front end parts starting from the connection part, the connection part configured to pivot each of the end parts from a first state to a second state.

2. The flight vehicle according to claim 1, wherein in the first state a positional relationship between the end parts and the main body part are fixed at least during horizontal flight, and in the second state a positional relationship between the end parts and the main body part are displaceable via the connection part at least during descent.

3. The flight vehicle according to claim 2, wherein, in the first state, the propulsion parts are oriented in a direction of travel; and wherein, in the second state, the propulsion parts are oriented in a direction oblique to a vertical direction.

4. The flight vehicle of claim 3,

Wherein each of the propulsion parts comprises a propeller which generates propulsive force; and wherein the connection part connects a front part of the main body part and the end parts, and each of the end parts connects to a central part of each of the propulsion parts.

* * * * *